United States Patent [19]

Peters et al.

[11] Patent Number: 5,043,217
[45] Date of Patent: Aug. 27, 1991

[54] COMPOSITE TO METAL JOINT FOR TORSIONAL SHAFTS

[75] Inventors: Stanley T. Peters, Mt. View; Alvin H. Nakagawa, San Jose, both of Calif.

[73] Assignee: Westinghouse Electric Corp., Pittsburgh, Pa.

[21] Appl. No.: 437,061

[22] Filed: Nov. 15, 1989

[51] Int. Cl.$^5$ .............................................. B32B 1/00
[52] U.S. Cl. .................................. 428/397; 428/587; 464/181
[58] Field of Search .............. 428/586, 587, 592, 377, 428/397; 156/172; 464/180, 181

[56] References Cited

U.S. PATENT DOCUMENTS

| | | | |
|---|---|---|---|
| 3,923,469 | 12/1975 | Palynchuk | 428/592 |
| 4,173,670 | 11/1979 | Van Auken | 428/36 |
| 4,236,386 | 12/1980 | Yates et al. | 138/109 |
| 4,238,540 | 12/1980 | Yates et al. | 428/36 |
| 4,259,382 | 3/1981 | Schwan | 428/36 |
| 4,358,284 | 11/1982 | Federmann et al. | 464/181 |
| 4,701,231 | 10/1987 | Peters et al. | 156/172 |
| 4,747,796 | 5/1988 | Iwai et al. | 464/180 |

OTHER PUBLICATIONS

Peters, S. T. & Humphrey, W. Donald, "Filament Winding", Engineering Materials Handbook, vol. 1, Composites, ASM International, 12/1987, pp. 503–518.
Yeaple, Frank, "Fiber-Reinforced Plastic Driveshafts Quiet Vans", Design News, 9/8/86, p. 148.

*Primary Examiner*—Alexander S. Thomas
*Attorney, Agent, or Firm*—D. Schron

[57] ABSTRACT

A composite to metal joint (10) for torsional shafts is disclosed that will not fail in simple shear and can be manufactured without slipping, bridging, or kinking of the filament using a filament winding machine. The composite to metal joint includes a filament composite (16) formed by winding the filament with the filament winding machine around a metal mandrel (12). The mandrel (12) has an outer surface (14) upon which said filament composite (16) is formed with a cross sectional shape that is asymmetrical about an axis of rotation (24). Also, the outer surface (14) presents a positive angle of incidence to said filament when said filament winding machine winds hoop plies and angle plies.

8 Claims, 3 Drawing Sheets

COMPOSITE TO METAL JOINT FOR TORSIONAL SHAFTS

BACKGROUND OF THE INVENTION

1. The Field of the Invention

The invention relates to a composite to metal joint for torsional shafts.

2. Description of the Prior Art

The use of composite fibers rather than metal for a torsional shaft, such as the drive shaft of an automobile, van or pickup truck, is desirable for many reasons, including for weight reduction, corrosion resistance, durability, and increased strength. However, even when a composite fiber is used as a torsional shaft, an end of the shaft must still be coupled to a metal at a joint that can withstand the torsional and other stresses that will exist during transfer of the load by rotation of the shaft. It is this joint that is usually the weakest point of the torsional shaft.

The use of adhesives has been attempted to increase the strength and durability of the joint, such as that described in U.S. Pat. No. 4,664,644, but the load transfer is entirely due to the adhesive. Pins in the form of bolts or rivets have also been used to increase the strength and durability of the joint, but such pins require drilling holes in both the metal and the composite, which tend to weaken the composite at the joint, and their usage substantially increases manufacturing expenses.

U.S. Pat. No. 4,358,284 describes using a metal at the joint having projections or depressions, such as grooves, bumps or flutes, providing a form locking connection at the joint, but such patent does not further specify the geometry of the projections that will accomplish this form locking connection.

One specific geometry proposed that will form a locking connection at the joint is disclosed in U.S. Pat. No. 4,236,386. As shown in FIG. 3 of the patent, the disclosed locking geometry of the metal has a cross section that consists of numerous out-of-plane flat surfaces with sharp angles between each flat surface. However, when filament winding the fibers over the flat sections of the metal, the radial component of fiber tension cannot be kept across the whole flat section, the requisite compaction of fibers cannot be kept, and voids will occur. Furthermore, the fiber path across the flat sections cannot be predicted with certainty.

SUMMARY OF THE INVENTION

It is an object of the present invention to provide a composite to metal joint for torsional shafts having increased strength and durability.

It is an additional object of the instant invention to provide a metal mandrel for a torsion shaft having an outer surface shape designed to provide such a joint having said increased strength and durability.

It is a further object of the present invention to provide a method of making a composite to metal joint having the strength and durability characteristics previously referenced and that also is not labor intensive.

With these objects in view, among others, the present invention resides in a composite to metal joint for torsional shafts that can be made with a filament winding machine that can wind a filament with angle plies and hoop plies.

The composite to metal joint includes a filament/resin composite formed by winding a resin-wetted filament about a metal mandrel having an outer surface which is asymmetrical in shape about an axis of rotation orthogonal to the plane of a cross section through the same. Preferably, the axis of rotation is coincident with the longitudinal axis of the mandrel. The outer surface also presents a positive angle of incidence to the filament at all times the filament winding machine winds hoop plies and angle plies. Most desirably, the outer surface of the mandrel is symmetrical at the joint about a plane which contains the axis of rotation.

Thus, the present invention advantageously provides a construction for a composite to metal joint for torsional shafts that inhibits failures in simple shear and can be manufactured with minimum or no slipping, bridging, or kinking of the filament.

BRIEF DESCRIPTION OF THE DRAWINGS

These and other advantages of the present invention may be appreciated from studying the following detailed description of the preferred embodiments together with the accompanying drawings in which.

DETAILED DESCRIPTION OF THE PREFERRED EMBODIMENT

A filament winding machine operates by winding a continuous filament around a mandrel. The filament is wound about the outer surface of a mandrel in various orientations to obtain a filament wound composite having desired characteristics.

Figure 1:
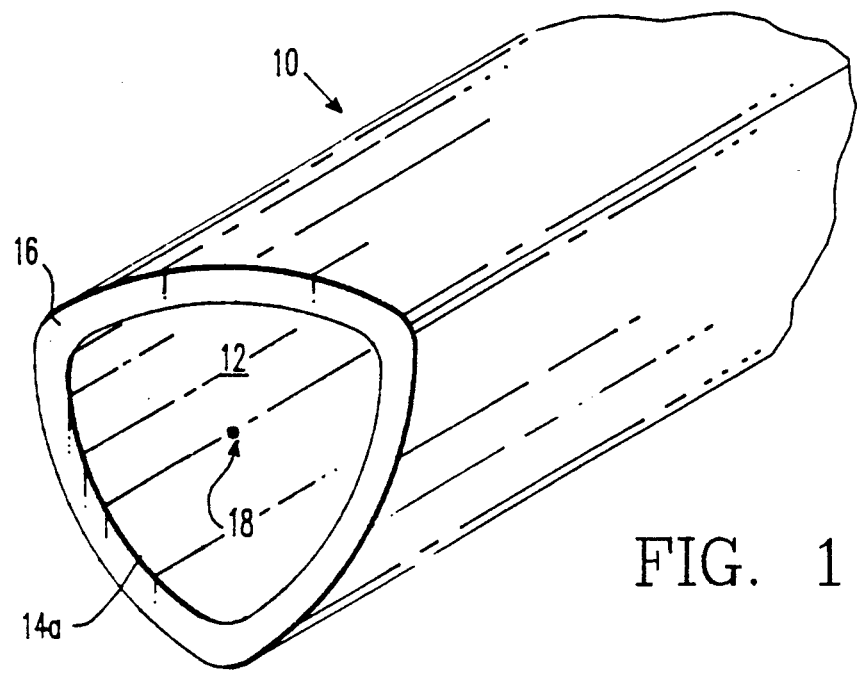
FIG. 1 illustrates a perspective cross section of the composite to metal joint according to a first embodiment of the present invention.

FIG. 1 illustrates a perspective view of one embodiment of a composite to metal joint 10 for torsional loads produced by a filament winding machine. The joint mandrel 12, which is made of metal, has an outer surface 14A on which the filament and resin that forms composite 16 is laid as the filament winding machine rotates about a longitudinal axis 18 of rotation.

Figure 2:
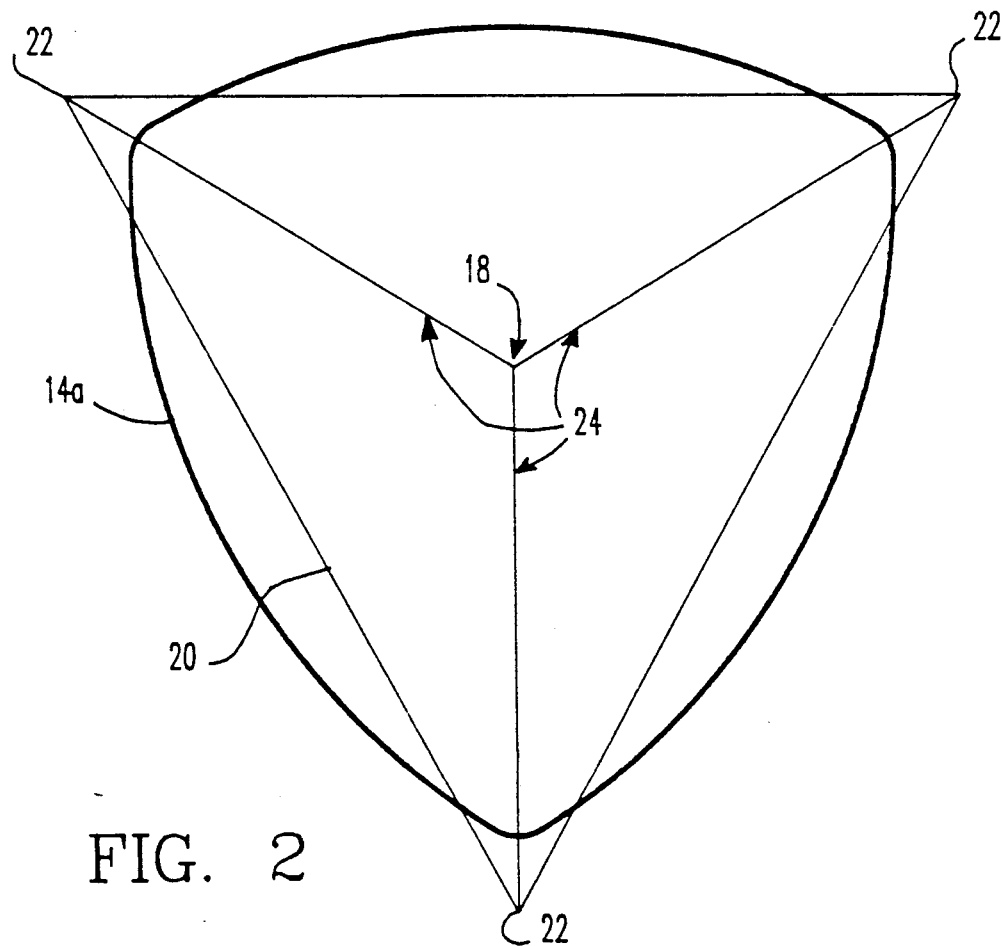
FIG. 2 illustrates an outer surface shape of the mandrel used in the first embodiment of the composite to metal joint of the present invention.

The cross section obtained by a plane passing orthogonally through longitudinal axis 18 of the mandrel 12 illustrated in FIG. 1 is drawn in FIG. 2. As illustrated, the outer surface of the mandrel is asymmetrical in shape about the axis 18. That is, there are variations at differing radial angles in the radial distances from the axis to the outer surface. However, the outer surface is symmetric about a plane which contains the axis.

In this particular embodiment, the cross sectional shape of outer surface 14A is derived from a triangle 20 in which each point 22 is rounded off or curved and each side is further rounded. Furthermore, with this cross sectional shape of outer surface 14A, a positive (or convex) surface, which is also termed ramp angle, is presented to the filament at all times (for the full rotation) it is being wound by filament from a winding machine. This is true when laying both hoop plies, which are laid 90° with respect to longitudinal axis 18, or angle plies, which are laid at some angle other than 90°, typically 45°, with respect to longitudinal axis 18. Hoop plies are used to resist circumferential or hoop loads and angle plies of 45° are used to resist torsion. Angle plies having an angle less than or greater than 45° are used to resist bending and tensile or compression loads.

By presenting such a positive surface to the filament being laid by the filament winding machine, slipping, bridging, or kinking of the filament during winding is inhibited. Thus, there will not be any voids in the resulting composite 16 and a high strength composite to metal joint 10 is obtained without other materials such as an adhesive, or additional processing steps, such as autoclaving.

It is important to note that the cross sectional shape of outer surface 14A of the composite to metal joint 10 in the embodiment shown in FIGS. 1 and 2 is illustrative only. From the broad standpoint, it is only necessary that the outer surface (1) be asymmetrical with respect to the axis of rotation and (2) present a positive surface to the filament being wound for both hoop and angle plies. A symmetrical or circular cross sectional shape orthogonal to the axis of rotation could not advantageously transfer torsional loads due to the symmetry through all lines passing through such axis.

Most desireably, the centroid of the outer surface lies on the rotational axis of the mandrel. This condition reduces vibration during rotation of the mandrel. Vibration leads to increased noise and to fatigue failure. One of several means of meeting this condition is to use a joint in which the outer surface has an axis of rotation symmetry that is coincident with the rotational axis of the mandrel. Shapes that meet this condition are easier to generate, model and manufacture. The shape shown in FIG. 2 has a 3-fold axis of rotational symmetry. The pattern coincides with itself if it is rotated by 360°/3=120° about its axis of rotation which is perpendicular to the plane of the figure.

Figure 3:
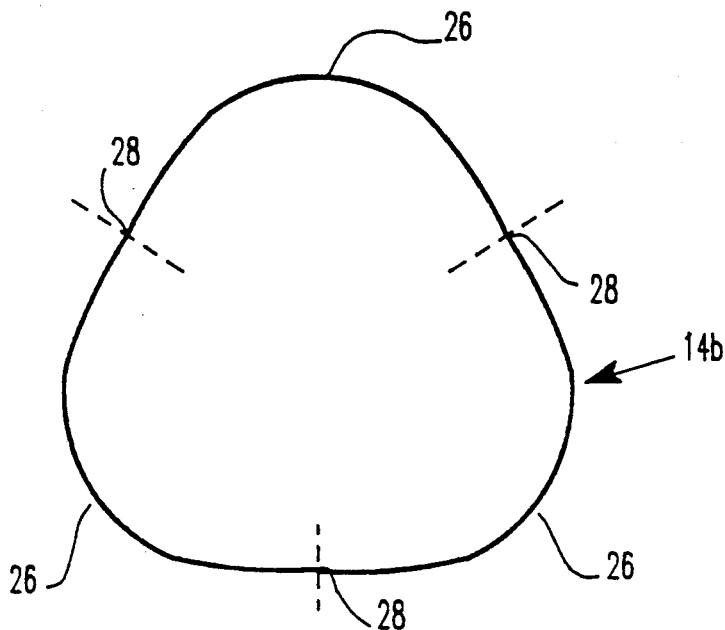
FIG. 3 illustrates an outer surface shape of a mandrel formed of parabolic segments used in a second embodiment of the composite to metal joint of the present invention.

FIG. 3 illustrates an outer surface 14B that also meets the above recited criteria. Outer surface 14B is derived from joining three parabolic segments 26. For the three parabolic segments 26 to meet the above criteria, the tangent of each endpoint 28 must be 60° degrees apart.

Figure 4:
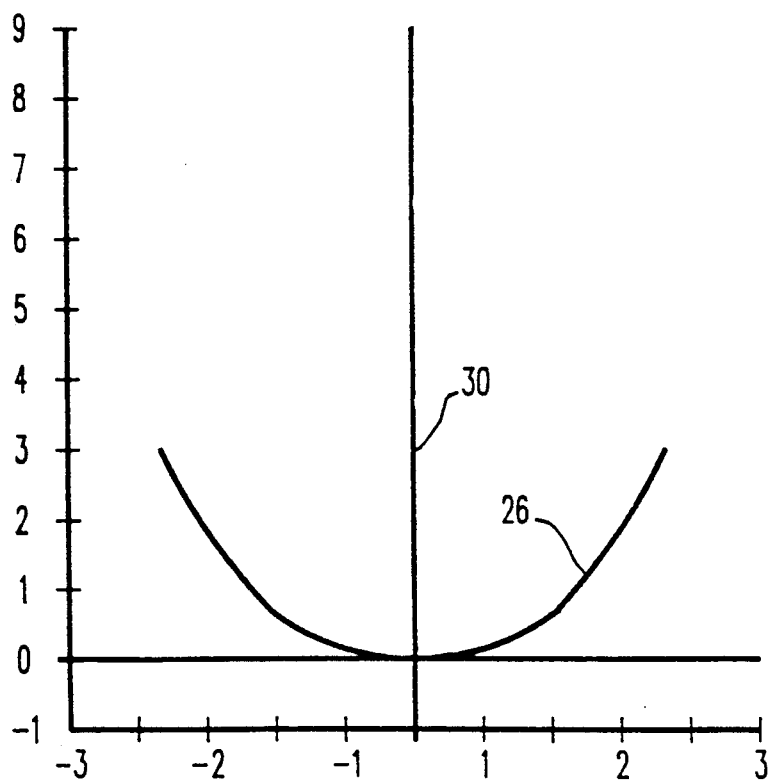
FIG. 4 graphically illustrates a parabolic segment according to the second embodiment of the present invention.

For a symmetric parabolic segment 26, each endpoint 28 tangent must be 30 from the parabola axis 30, shown in FIG. 4. The equation for such a parabola with symmetric parabolic segments 26 is given by:

$$x^2 = 4Py, \quad (1)$$

where:
 x = x coordinate
 y = y coordinate, and

The endpoints 28 that satisfy the angular requirement recited above for a smooth curve are given by:

$$x = 2P\sqrt{3}, \text{ and} \quad (2)$$

$$y = 3P. \quad (3)$$

When P=1, the parabolic segment 26 illustrated in FIG. 4 results. The shape of this parabolic segment 26 is unique, and variations in P only affect its absolute size. The combination of three parabolic segments 26 of FIG. 4 results in the cross sectional shape of outer surface 14B shown in FIG. 3.

Figure 5:
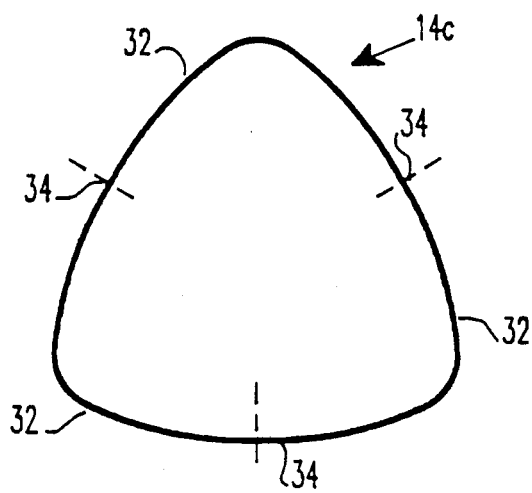
FIG. 5 illustrates an outer surface shape of a mandrel formed of elliptical segments used in a third embodiment of the composite to metal joint of the present invention.

FIG. 5 illustrates another outer surface that also meets the above recited criteria. Outer surface 14C is derived from joining three elliptical segments 32. For the three elliptical segments 32 to meet the above criteria, the tangent of each endpoint 34 must be 60° degrees apart, as with the parabolic segments 26.

An ellipse, with only a single constant "c" is formed by the equation:

$$x^2 + y^2/c^2 = 1 \quad (4)$$

The endpoints 34 that satisfy the angular requirement recited above for a smooth curve are given by:

$$x = (3/(c^2+3))^{\frac{1}{2}}, \text{ and} \quad (5)$$

$$y = c^2(c^2+3)^{-\frac{1}{2}}. \quad (6)$$

Figure 7:
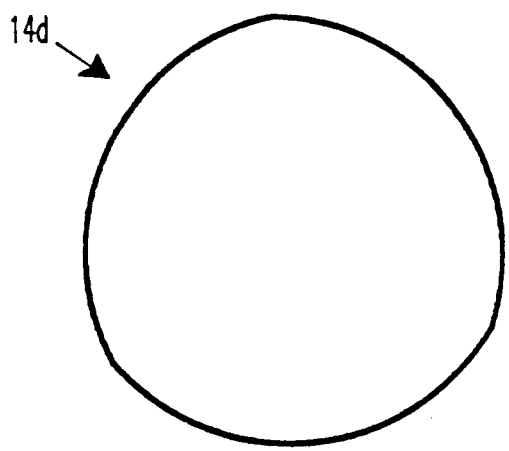
FIG. 7 illustrates an outer surface shape of a mandrel formed of elliptical segments used in a fourth embodiment of the composite to metal joint of the present invention.
Figure 6:
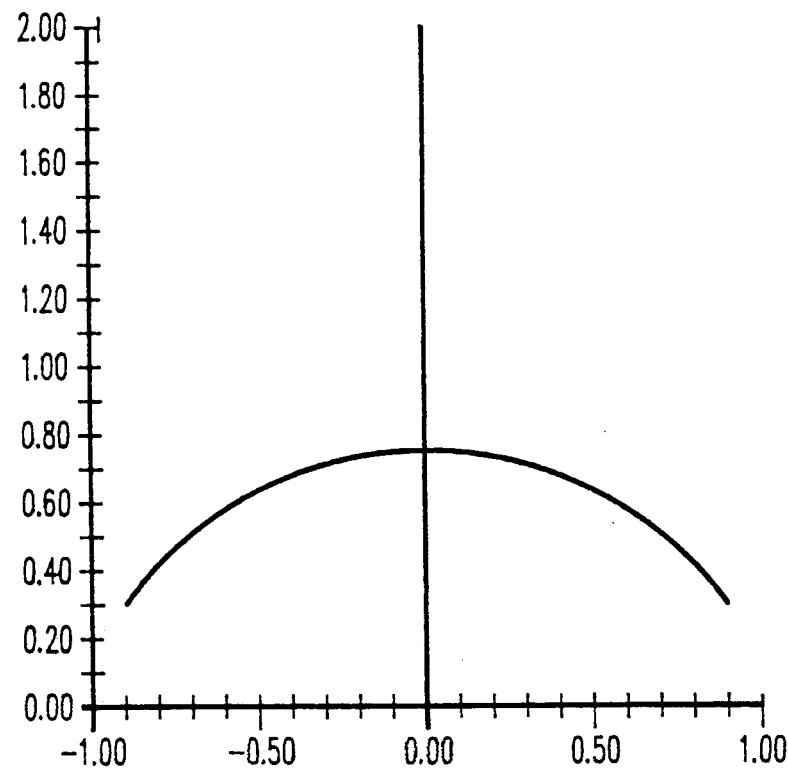
FIG. 6 graphically illustrates an elliptical segment according to the third embodiment of the present invention.

When c=0.75, the elliptical segment 32 illustrated in FIG. 6 results. The combination of three elliptical segments 32 of FIG. 6 results in the outer surface 14D shown in FIG. 7. For three elliptical segments 32 derived from an ellipse in which c=0.25, the outer surface 14C shown in FIG. 5 results.

Most desirably, a portion of the mandrel remains with the composite to form the inner part of the structure to transfer torsional loads to another metal component. Moreover, the cross-sectional shape of the mandrel gradually varies from the cross-sections of FIG. 2, FIG. 3, FIG. 5, and FIG. 7 to a circular cross-section, resulting in a smooth transition from the joint to the shaft.

While the invention has been described in connection with what is presently considered to be the most practical and preferred embodiments, it is understood that the invention is not limited to the disclosed embodiments. Primarily, other cross sectional outer surfaces satisfying the criteria set forth above do exist. Thus, the present invention is intended to cover various modifications and equivalent arrangements included within the spirit and scope of the appended claims.

We claim as our invention:

1. A composite to metal joint that can be made with a filament winding machine that can wind a filament with both angle plies and hoop plies, comprising:
 a metal mandrel having an outer surface whose cross section is asymmetrical in shape about an axis of rotation orthogonal to the plane of said cross section and presents a positive angle of incidence to said filament at generally all times said filament winding machine winds hoop plies and angle plies; and
 a filament composite formed by winding said filament with said winding machine about said outer surface with both angle plies and hoop plies.

2. A composite to metal joint according to claim 1 wherein the centroid of said outer surface of said mandrel lies on said axis of rotation.

3. A composite to metal joint according to claim 1 wherein said cross sectional shape of said mandrel outer surface is generally the same along said axis for generally the full extent of said joint.

4. A composite to metal joint for torsional shafts according to claim 3 wherein said cross sectional shape of said mandrel is based upon a triangle having curved corners.

5. A composite to metal joint for torsional shafts according to claim 4 wherein said cross sectional shape of said mandrel outer surface is formed of a plurality of parabolic segments.

6. A composite to metal joint according to claim 5 wherein each of said parabolic segments is symmetric.

7. A composite to metal joint for torsional shafts according to claim 3 wherein said cross sectional shape of said mandrel is formed of a plurality of elliptical segments.

8. A composite to metal joint that can be made with a filament winding machine that can wind filament with both angle plies and hoop plies, comprising:
a metal mandrel having an outer surface whose cross section is asymmetrical in shape about an axis of rotation orthogonal to the plane of said cross section and yet is symmetrical about a plane containing said axis, the cross sectional shape of said mandrel outer surface being the same along said axis for generally the full extent of said joint and said outer surface being shaped to present a positive angle of incidence to said filament as said mandrel is rotated about said axis when said filament winding machine winds hoop plies and angle plies; and
a filament composite formed by winding said filament with said winding machine a plurality of times about said outer surface with both angle plies and hoop plies.

* * * * *